(12) United States Patent
Mukomilow

(10) Patent No.: US 7,806,346 B2
(45) Date of Patent: Oct. 5, 2010

(54) CASCADE UNIT FOR A HEATING SYSTEM WITH TWO OR MORE HEATING BOILERS

(75) Inventor: Dariusz Mukomilow, Meissen (DE)

(73) Assignee: Comfort-Sinusverteiler GmbH, Wettringen (DE)

( * ) Notice: Subject to any disclaimer, the term of this patent is extended or adjusted under 35 U.S.C. 154(b) by 1105 days.

(21) Appl. No.: 11/460,127

(22) Filed: Jul. 26, 2006

(65) Prior Publication Data

US 2007/0144458 A1 Jun. 28, 2007

(30) Foreign Application Priority Data

Dec. 23, 2005 (DE) .................. 20 2005 020 098 U

(51) Int. Cl.
- F24D 3/10 (2006.01)
- F24D 3/00 (2006.01)
- F22B 37/24 (2006.01)
- F16L 41/00 (2006.01)

(52) U.S. Cl. .............. 237/56; 237/57; 122/235.15; 122/493; 122/510; 122/511; 137/561 A

(58) Field of Classification Search ............ 237/56, 237/57, 69; 122/450, 493, 510, 511, 235.15; 137/561 A See application file for complete search history.

(56) References Cited

U.S. PATENT DOCUMENTS

| | | | | |
|---|---|---|---|---|
| 2,677,353 A | * | 5/1954 | Sharp | 122/12 |
| 3,465,726 A | * | 9/1969 | Gerst | 122/1 R |
| 4,406,794 A | * | 9/1983 | Brigante | 210/695 |
| 4,785,792 A | * | 11/1988 | Saint Laurent | 126/344 |
| 4,869,208 A | * | 9/1989 | Adams | 122/214 |
| 5,390,660 A | * | 2/1995 | Danielson | 126/271.2 R |
| 7,509,927 B2 | * | 3/2009 | Mukomilow | 122/235.15 |
| 2005/0258264 A1 | * | 11/2005 | Simensen et al. | 237/69 |
| 2007/0187521 A1 | * | 8/2007 | Wawak | 237/19 |

FOREIGN PATENT DOCUMENTS

| | | | |
|---|---|---|---|
| DE | 20211303 U1 | | 1/2003 |
| DE | 10341002 A1 | * | 5/2004 |
| FR | 2852672 A1 | * | 9/2004 |
| JP | 03274301 A | * | 12/1991 |
| JP | 06217852 A | * | 8/1994 |

* cited by examiner

Primary Examiner—Steven B McAllister
Assistant Examiner—Patrick F. O'Reilly, III
(74) Attorney, Agent, or Firm—Greer, Burns & Crain, Ltd.

(57) ABSTRACT

A cascade unit for a heating system with two or more heating boilers, in particular condensing boilers, with a hydraulic shunt which is connected on the one hand with the inlet flows and return flows of all heating boilers and on the other hand with at least one heating circuit inlet flow and heating circuit return flow each, with the cascade unit furthermore comprising one each of the essentially horizontally extending boiler inlet flow header and boiler return flow manifold, the header and the manifold being connected with the hydraulic shunt, and the header and the manifold each being designed with prepared connecting nozzles fittingly placed for a group of two or more heating boilers for the connection of the heating boiler inlet flows and the heating boiler return flows. The cascade unit forms at least one self-supporting support frame on which at least one of the heating boilers is mountable.

14 Claims, 15 Drawing Sheets

CASCADE UNIT FOR A HEATING SYSTEM WITH TWO OR MORE HEATING BOILERS

BACKGROUND OF THE INVENTION

This invention relates to a cascade unit for a heating system with two or more heating boilers, in particular condensing boilers, with a hydraulic shunt which is connected on the one hand with the inlet flows and return flows of all heating boilers and on the other hand with at least one heating circuit inlet flow and heating circuit return flow each, with the cascade unit furthermore comprising one each of the essentially horizontally extending boiler inlet flow header and boiler return flow manifold, the header and the manifold being connected with the hydraulic shunt, and the header and the manifold each being designed with prepared connecting nozzles fittingly placed for a group of two or more heating boilers for the connection of the heating boiler inlet flows and the heating boiler return flows.

A cascade unit of the aforementioned type is known from DE 202 11 303 U1. This known cascade unit can be provided with feet placeable on a floor and/or with brackets mountable on a wall or a ceiling. By means of these feet or brackets, the cascade unit can, for itself, be mounted with sufficient stability; however, this known cascade unit is not able to carry the associated boilers because the boilers on the one hand and the cascade unit on the other hand are connected with each other only via the boiler inlet flow connections and the boiler return flow connections. The boiler inlet flow connections and the boiler return flow connections are, however, not suitable for taking up the great weight of the boilers. It has thus been required, until now, to install the boilers by themselves, with a hanging installation on a wall or on a ceiling of a heating room usually being provided with modern boilers. Usually, frames or brackets are first mounted on the wall or the ceiling for that on which the boilers will then be mounted in suspension.

With this known state of the art, it is considered disadvantageous that, for the heating installation, major assembly expenditures are required on location in the heating room and that, additionally, very precise workmanship is absolutely required so that the heating boilers on the one hand provided on the wall or on the ceiling and the cascade unit also mounted in the heating room with its own feet or brackets will be positioned correctly to each other. Experience has shown that this presents a source of errors, resulting in frequently expensive adjustment work or modifications being required when the cascade unit is hydraulically connected with the boilers.

SUMMARY OF THE INVENTION

For this invention, the problem accordingly presents itself of creating a cascade unit of the initially mentioned type which avoids the presented disadvantages and which achieves, in particular, a significant reduction of the assembly expenditure in the installation of a heating system and which enables an extensive and thus cost-saving prefabrication as well as a smooth transport.

In accordance with the invention, this problem is solved with a cascade unit of the initially mentioned type which is characterized in that it forms at least one self-supporting support frame on which at least one of the heating boilers (each) is mountable.

With the cascade unit according to the invention, this cascade unit itself advantageously forms a support frame serving for the attachment of one or several heating boilers, thus a separate mounting of the heating boilers on a wall or the ceiling of the heating room no longer being required. Moreover, the cascade unit according to the invention offers the advantage that the associated boilers can be already assembled and prefabricated together with the cascade unit and subsequently transported to the place of installation of the heating system. Thus, prefabrication will be possible in a clean production building which offers adequate space and all the required auxiliaries. On location in the heating room of the heating system, the cascade unit including the boilers need then only be connected at very few points with a heating network, a fuel feed line, a waste gas line and with electrical lines which will advantageously keep the installation expenditure at the place of installation very low and largely excludes installation errors.

To be able to meet several functions each with one component within the cascade unit, header and manifold preferably are bearing elements of the self-supporting support frame.

In a further development, it is preferably provided that the header and the manifold are arranged at a distance to each other in a vertical plane and that vertical pipe sections are provided between the header and the manifold, with the pipe sections being hydraulically connected either with the header or with the manifold and carrying water at least over partial sections of their length and comprising connecting nozzles for the connection of the heating boiler inlet flows and the heating boiler return flows. This embodiment of the cascade unit provides a design of relatively great height and relatively small depth.

In an alternative embodiment thereto, it is provided that the header and the manifold are arranged in a horizontal plane at a distance to each other and that horizontal pipe sections are provided between the header and the manifold, with the pipe sections being hydraulically connected either with the header or with the manifold and carrying water at least over partial sections of their length and comprising or bearing the connecting nozzles for the connection of the heating boiler inlet flows and the heating boiler return flows. This embodiment of the cascade unit offers a design of relatively low height and greater depth. In both above specified embodiments, a particularly high degree of integration of the different functions with few individual parts will be achieved which is very advantageous not only in terms of the technical side of manufacturing but also with regard to the material expenditure and the manufacturing costs.

Furthermore, it is preferably provided that the header, the manifold and the vertical or horizontal pipe sections are designed as hydraulically and statically adequately dimensioned round or square steel pipes. In the embodiment here specified, the header, the manifold and the vertical or horizontal pipe sections can be designed with high strength and carrying capacity and can moreover be welded with each other without any problems, without any particularly high material costs being incurred or any particularly difficult processing being required.

To be able to hydraulically couple the hydraulic shunt forming one part of the cascade unit as advantageously as possible and without detours with the header and the manifold, it is proposed that the header and the manifold are each connected on their one lateral face end with the essentially vertically oriented hydraulic shunt, with the header connecting to the shunt on the top and the manifold on the bottom.

A further development of the cascade unit provides that the hydraulic shunt is firmly connected with the header and the manifold and forms a bearing element of the self-supporting support frame. In this embodiment, the hydraulic shunt also assumes a bearing function within the support frame. Expediently, the hydraulic shunt here consists of a housing of steel, preferably with a rectangular cross section so that, here too, a solid and durable welding connection of the header and the manifold with the housing of the hydraulic shunt will be possible without any problem.

Alternatively, the hydraulic shunt can be detachably connected with the header and the manifold and form a non-bearing element or a bearing element of the self-supporting support frame. This embodiment of the cascade unit will be expedient in particular when it is to be used in different applications once with the hydraulic shunt and once without the hydraulic shunt.

To be able to adjust the cascade unit according to the invention as simply as possible to the different requirements in terms of the heat output, one embodiment of the invention proposes that the cascade unit comprises several self-supporting support frames which are each mechanically and hydraulically detachably connected in the area of the face ends of the header and the manifold. In this embodiment of the cascade unit, the support frames are forming a module system, wherein with one or several basic types of the support frame differently sized cascade units are fast and easily realizable with different numbers of heating boilers. Due to the connection of the respectively abutting face ends of the headers and manifolds of two adjacent support frames each, they will be mechanically as well as hydraulically connected with each other in one operation which keeps the installation expenditure advantageously low.

To ensure an unrestricted application of the cascade unit, the header and the manifold are each expediently formed on one or on both face ends with one standardized connecting means each, preferably a connecting flange.

Another measure which serves to keep the installation expenditure low consists of the/each support frame preferably comprising prepared boiler mounting elements adjusted to the boilers to be mounted. Thus, the possibility exists to adjust through a simple replacement of the boiler mounting elements the cascade unit to differently sized heating boilers or to boilers of different manufacturers.

Since a heating system comprises aside from the heating boilers, the header and the manifold and the hydraulic shunt still other components, another embodiment of the cascade unit proposes that the support frame comprises mounting elements and/or connections for other components of the cascade unit, in particular for expansion vessels, vent fittings, sensors, control devices and other fittings and/or functional elements.

An additional step in the direction of the most extensive prefabrication of the cascade unit consists of a line section with suitably positioned branches to all mounted boilers being arranged on the support frame for the supply of gaseous or liquid fuel. Advantageously, in this embodiment of the cascade unit, the line section for the fuel must only be connected at a single interface with a line section supplying the fuel into the heating room; all other connections and branches within the cascade unit for the distribution of the fuel to the boilers can be manufactured already in advance and checked for their tightness.

For the same objective, it is proposed that, on the support frame, one line section (each) is arranged with suitably positioned line branches from all mounted boilers for the collection and removal of waste gases and/or the collection and removal of condensate.

To be able to transport and move the cascade unit as easily as possible before its final installation, several casters can be provided on the underside of the support frame. With these casters, the cascade unit can be moved by muscle power alone which, in many application cases, will render unnecessary the expensive use of hoisting or transporting equipment.

Since the casters are no longer required after the final installation of the cascade unit in the heating room, one embodiment proposes that the casters are detachably mounted on the support frame and can be replaced by floor or wall brackets.

Another advantageous embodiment proposes that the header and the manifold are arranged in a horizontal plane at a distance to each other and that pipe sections extend vertically from the header and the manifold to the boiler, with the pipe sections being mechanically and hydraulically connected with the respectively allocated header or manifold and with the pipe sections having connecting nozzles for connection to the boiler. With this advantageous embodiment, the hydraulic shunt is preferably hydraulically and mechanically connected with the manifold.

Thus, for the connection of the header with the hydraulic shunt, a bypass is advantageously provided comprising a horizontal line section and a vertical line section. The bypass here extends with its horizontal line section from the header towards the manifold and passes to the vertical line section which is connected at an upper end of the hydraulic shunt with it, so that the header is hydraulically connected with the hydraulic shunt.

BRIEF DESCRIPTION OF THE DRAWING

Additional advantageous embodiments of the invention are disclosed in the sub-claims and the following description of the figures. It is shown:

In the different figures, same parts are always provided with the same reference numbers so that, as a rule, they will also be described only once.

DETAILED DESCRIPTION OF THE PREFERRED EMBODIMENT

Figure 1:
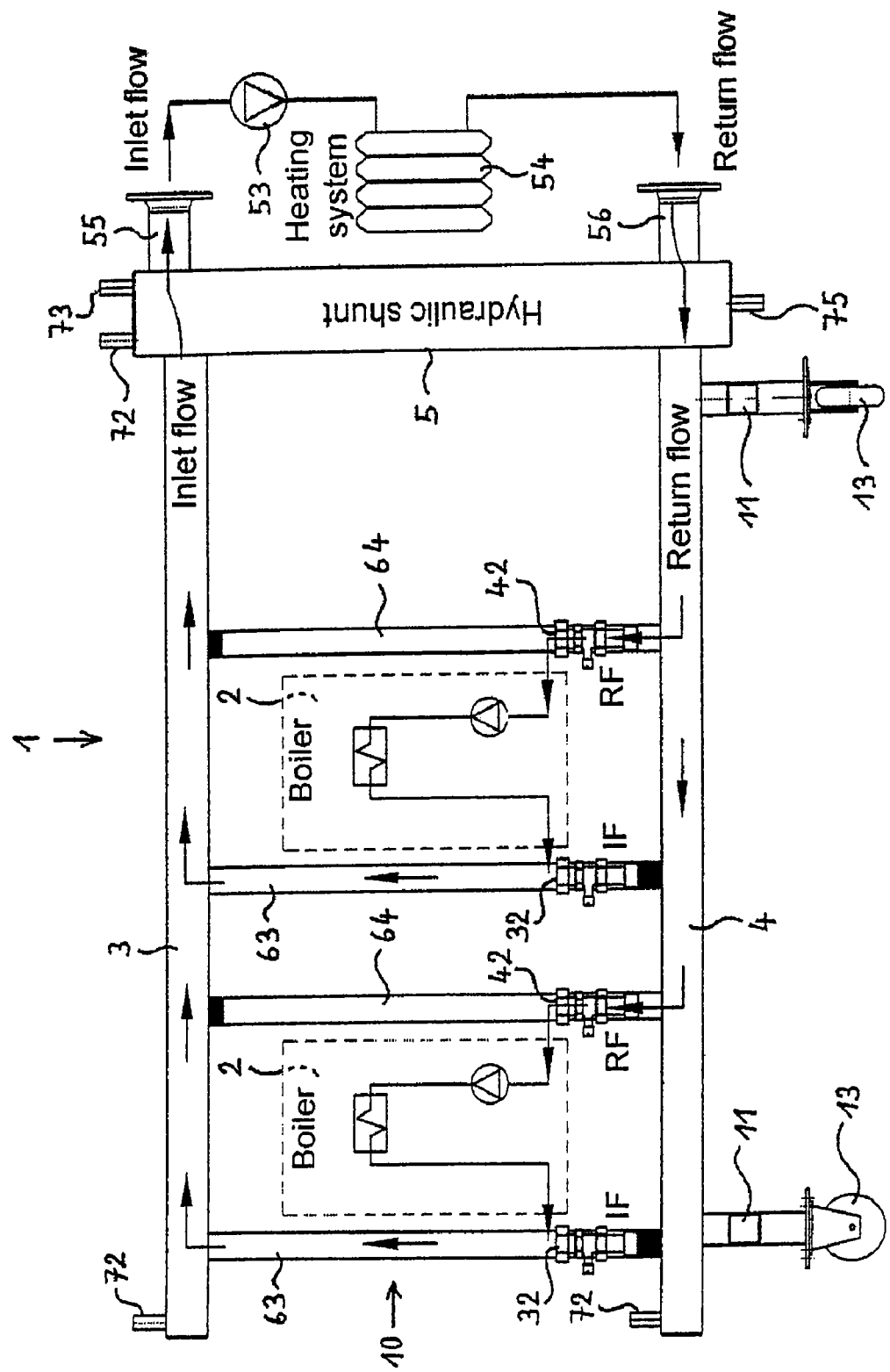
FIG. 1 is a cascade unit in a first embodiment, in a front view.

In the example of the cascade unit 1 according to FIG. 1, it is designed for taking up two heating boilers 2. For this, the cascade unit 1 comprises on the top a horizontally extending boiler inlet flow header 3 and at a vertical distance thereunder an also horizontally extending boiler return flow manifold 4. In a vertical direction, the header 3 and the manifold 4 are mechanically connected with each other through vertical pipe sections 63 and 64. Here, alternately, a vertical pipe section 63 is hydraulically connected with the header 3 and a pipe section 64 with the manifold 4. That means that the pipe sections 63 are impervious to liquids at their bottom end and are here only mechanically connected with the manifold 4, not however hydraulically. Correspondingly, the vertical pipe sections 64 are connected at their upper end only mechanically with the header 3, not however hydraulically.

At their right face end in FIG. 1, the header 3 and the manifold 4 are connected mechanically as well as hydraulically with a vertically aligned shunt 5. On its side showing to the right in FIG. 1 and facing away from the header 3 and the manifold 4, the hydraulic shunt 5 comprises on the top a heating circuit inlet flow connection 55 and on the bottom a heating circuit return flow connection 56. A heating circuit can be connected to these connections 55, 56 which is here purely schematically combined with a symbolically presented pump 53 and an also symbolically presented heating system 54.

The header 3, the manifold 4, the vertical pipe sections 63 and 64 and the hydraulic shunt 5 here form a solid, self-supporting support frame 10 which is capable of carrying the heating boilers 2, without the heating boilers 2 having to be held via other fastening elements on a wall or another building part or on separate carriers.

The supply of the water flowing through the cascade unit 1 and the heating circuit, serving as the heat transport medium to the individual boilers 2 and the delivery of the heated water from the boilers 2 into the heating circuit is here effected via the connecting nozzles 32 and 42, respectively. One connecting nozzle 32 each is here allocated to each vertical pipe section 63, and one connecting nozzle 42 each to each vertical pipe section 64, not only mechanically but also hydraulically. To take up the weight of the heating boilers 2, the support frame 10 is provided with boiler mounting elements here not shown which are designed to fit with the size and type of the boiler 2 to be respectively mounted and which are positioned within the support frame 10.

Below the manifold 4, two crossbars 11 are provided which carry a total of four casters 13 on the underside. By means of these casters 13, the complete cascade unit 1 including the boilers 2 can be moved in a rolling manner by muscle power, without the use of hoisting or transport equipment. After the cascade unit 1 has been brought to its place of installation, the casters 13 can be separated from the support frame 10 and replaced by fixed floor or wall brackets.

Additionally, the cascade unit 1 in the example presented in FIG. 1 also comprises several vent fittings 72 to be able to automatically or manually vent the header 3, the manifold 4 and the hydraulic shunt 5. A sensor 73 is provided on the upper side of the hydraulic shunt 5, for example a thermometer provided in a dip sleeve. Finally, on the lower end of the hydraulic shunt 5, on the part of the cascade unit 1 which is lowest and flowed through b>water, a drainage nozzle 75 is provided via which the cascade unit 1 can be drained as needed. Moreover, the nozzle 75 can be used for the removal of sludge which settles in the lower part of the hydraulic shunt 5.

Figure 2:
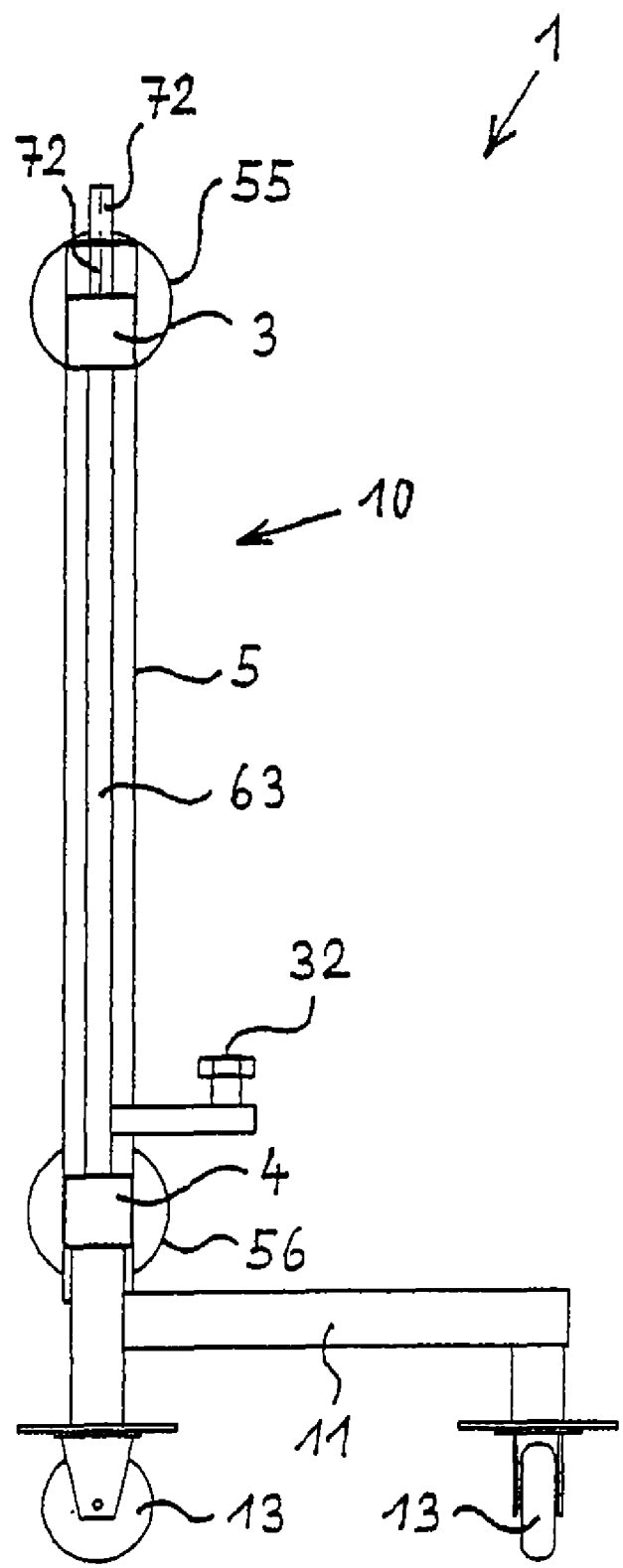
FIG. 2 is the cascade unit of FIG. 1 in a side view.

FIG. 2 now shows the cascade unit 1 of FIG. 1 in a side view onto the left side in FIG. 1. Here, the compact construction of the cascade unit 1 and the support frame 10 will be especially obvious, with the heating boilers 2 not being drawn into FIG. 2.

In FIG. 2, the front ends of the boiler inlet flow header 3 and the boiler return flow manifold 4 are facing the viewer. The pipe section 63 extends vertically between them; additional pipe sections 63 and 64 (compare FIG. 1) are provided hidden behind it. All the way in the back of FIG. 2, the hydraulic shunt 5 is provided which has a greater depth than the vertical pipe sections 63 and 64.

From the lower area of the visible vertical pipe section 63, the connecting nozzle 32 extends towards the front and the top through which the water to be heated can be supplied to the heating boiler. The other connecting nozzles 32 and the connecting nozzles 42 (compare FIG. 1) are hidden behind it in FIG. 2.

Behind the hydraulic shunt 5, the heating circuit inlet flow connection 55 is provided on the top and the heating circuit return flow connection 56 on the bottom, each in the form of a round connecting flange.

In the lower area of the support frame 10, one of the crossbars 11 extends horizontally; the second crossbar 11 is provided hidden behind it. On the underside, the crossbars 11 are provided with casters 13, two of which are visible in FIG. 2.

All the way on top in FIG. 2, the two vent fittings 72 are still visible which rest on the upper side of the header 3 and on the upper side of the hydraulic shunt 5.

Figure 3:
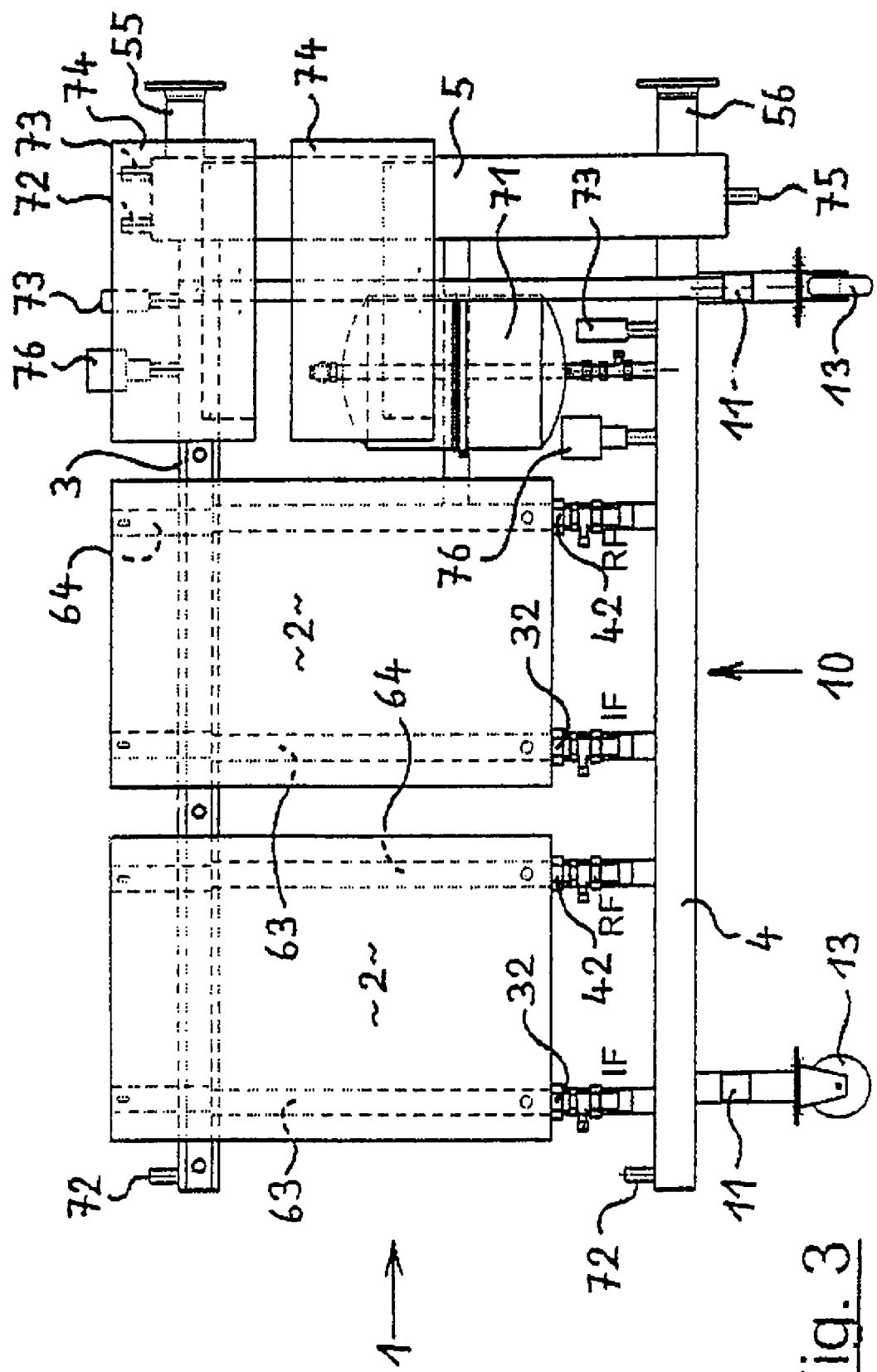
FIG. 3 is the cascade unit in a second embodiment in a front view.

FIG. 3 shows an example of the cascade unit 1 in which other components of a heating system are provided on the support frame 10 in addition to two heating boilers 2. The self-supporting support frame 10 is formed, here again, by the boiler inlet flow header 3 extending horizontally on the top, in parallel therewith the boiler return flow manifold 4 extending horizontally on the bottom, the vertically extending pipe sections 63 and 64 arranged between them, and the hydraulic shunt 5. To obtain a solid construction, the indicated parts are expediently rectangular steel profiles or pipes and welded with each other. The two heating boilers 2 are each respectively hydraulically connected via one of the connecting nozzles 32 with the header 3 and one of the connecting nozzles 42 with the manifold 4. The largest part of the vertical pipe sections 63 and 64 lies here respectively hidden behind the two heating boilers 2.

On the right side next to the right boiler 2 in FIG. 3, two control devices 74 are mounted one on top of the other on the top of the support frame 10, with one control device 74 each being respectively allocated to one of the heating boilers 2. Behind the lower control device 74, an expansion vessel 71 is provided, partially hidden by it, which is hydraulically connected with the manifold 4. Other components, here forming one part of the cascade unit 1, are several vent fittings 72 on the header 3, the manifold 4 and the hydraulic shunt 5, a sensor 73 on the upper side of the hydraulic shunt 5 and a drainage nozzle 75 on the underside of the hydraulic shunt 5. Additionally, one pressure switch 76 each is here also provided on header 3 and manifold 4.

On the right side in FIG. 3, the hydraulic shunt 5 again comprises on the top the heating circuit inlet flow connection 55 and on the bottom the heating circuit return flow connection 56 for combining the cascade unit 1 with a heating circuit.

In the lower part of the support frame 10, again two crossbars 11 are arranged below the manifold 4 which are provided with a total of four casters 13 on the underside. Here again, the complete cascade unit 1 can be moved by means of the casters 13 without hoisting and transport equipment to transport the unit to a place of installation.

Figure 4:
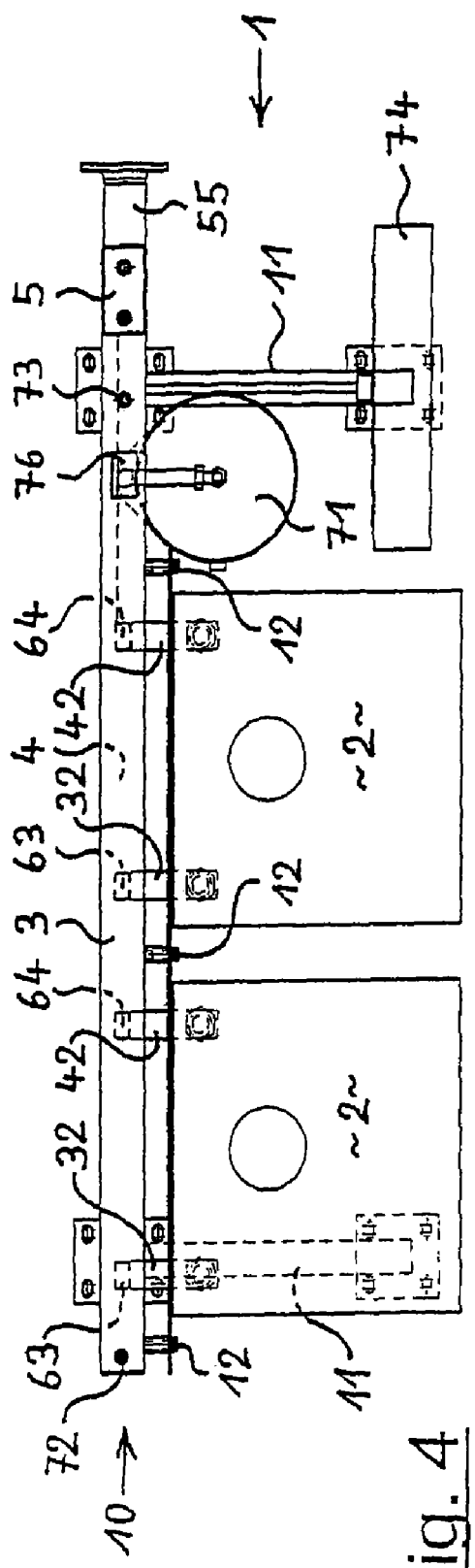
FIG. 4 is the cascade unit of FIG. 3 in a top view.

FIG. 4 shows the cascade unit 1 of FIG. 3 in a top view. On the top in FIG. 4, the header 3 is now provided and underneath, hidden, the manifold 4 which are both connected with each other by the vertical pipe sections 63 and 64 here also hidden and thus presented in a broken line.

On the bottom in FIG. 4, the two boilers 2 can be seen in a top view which are each hydraulically connected with the header 3 and the manifold 4 via the connecting nozzles 32 and 42. Moreover, the boilers 2 are mechanically connected with the support frame 10 via the boiler mounting elements 12. In this fashion, the support frame 10 takes over the entire load which the heating boilers 2 present, so that here as well, the heating boilers 2 are exclusively mounted in suspension on the support frame 10.

The expansion vessel 71 is provided on the right next to the right heating boiler 2 in FIG. 4. The control devices 74 are placed in front, easily accessible for an operating person. All the way in the background of FIG. 4, the lower crossbars 11 are now provided with the casters here not visible.

The hydraulic shunt 5 is visible on the top right in FIG. 4 in connection to the right face end of header 3 and manifold 4, in a top view. Towards the right, the heating circuit inlet flow connection 55 extends from the hydraulic shunt 5; the heating circuit return flow connection is provided hidden thereunder.

All the way on the left, the vent fitting 72 is visible on the upper side of the header 3. On the upper side of the header 3, the sensor 73 is provided on its right end area. The pressure switch 76 is provided to the left next to it.

Figure 5:
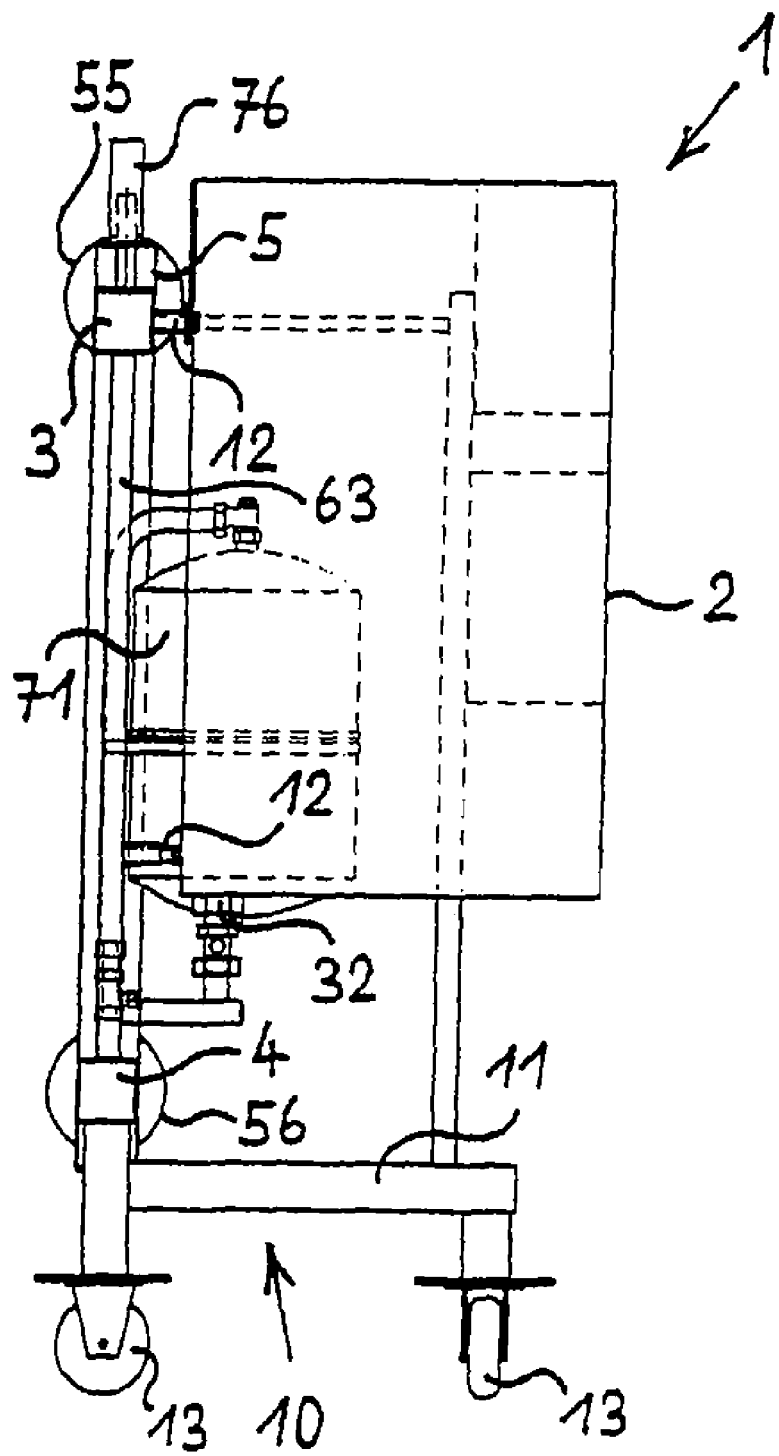
FIG. 5 is the cascade unit of FIGS. 3 and 4 in a side view.

FIG. 5 shows the cascade unit 1 from FIGS. 3 and 4 in a lateral view on the left side. To the left in FIG. 5, the header 3 is visible on the top and the manifold 4 on the bottom in the front view. Vertically connected are the header 3 and the manifold 4 via the hydraulic shunt 5 lying in the background, and the vertical pipe sections of which only the front pipe section 63 is here visible.

From the visible pipe section 63, the connecting nozzle 32 extends toward the front and the top, the nozzle being connected with the associated boiler 2. The other connecting nozzle 32 and the other connecting nozzles 42 (compare FIGS. 3 and 4) hydraulically connected with the manifold are hidden in FIG. 5 and thus are not visible.

Behind the heating boiler 2 visible in FIG. 5, the second heating boiler 2 is provided; the expansion vessel 71 is provided behind it again.

On the bottom of FIG. 5, one of the two crossbars 11 with two of the casters 13 is again visible.

Finally, on the left in the background of FIG. 5, the heating circuit inlet flow connection 55 and the heating circuit return flow connection 56 are partially still visible in the form of the round connecting flanges.

Figure 6:
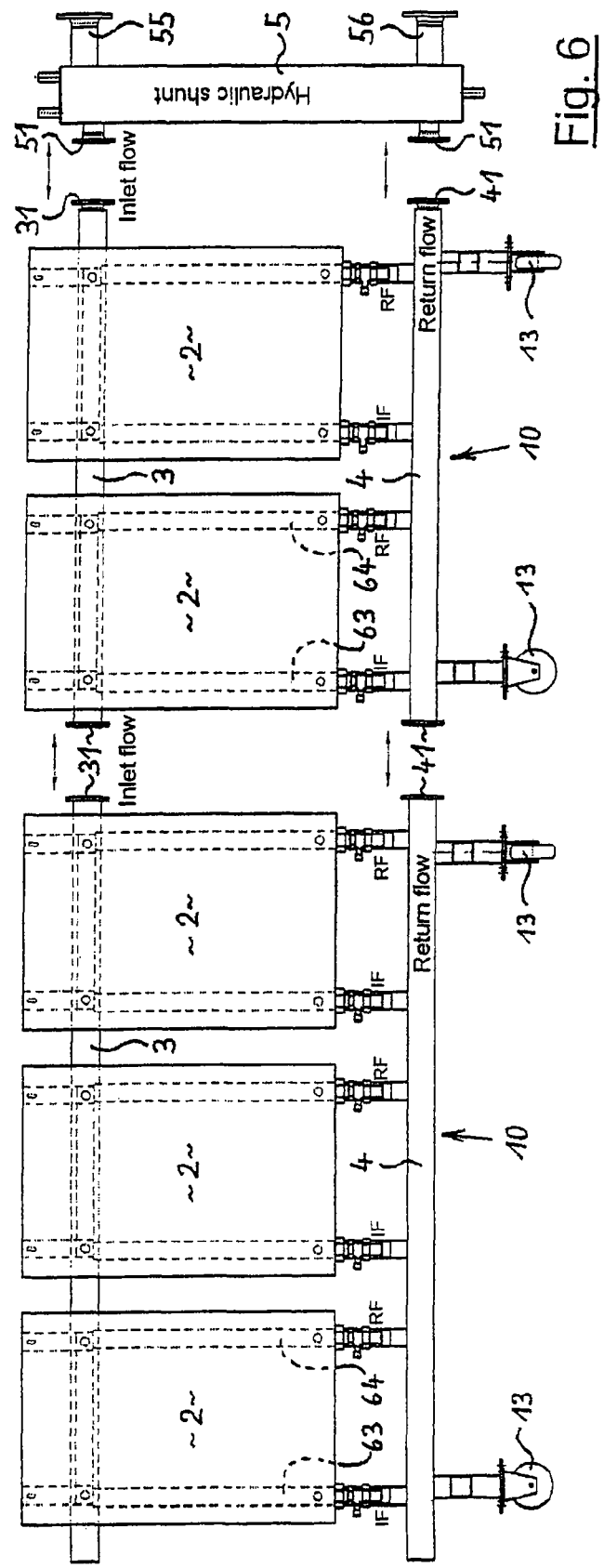
FIG. 6 is the cascade unit in an additional, modular embodiment in a front view, before assembly.
Figure 7:
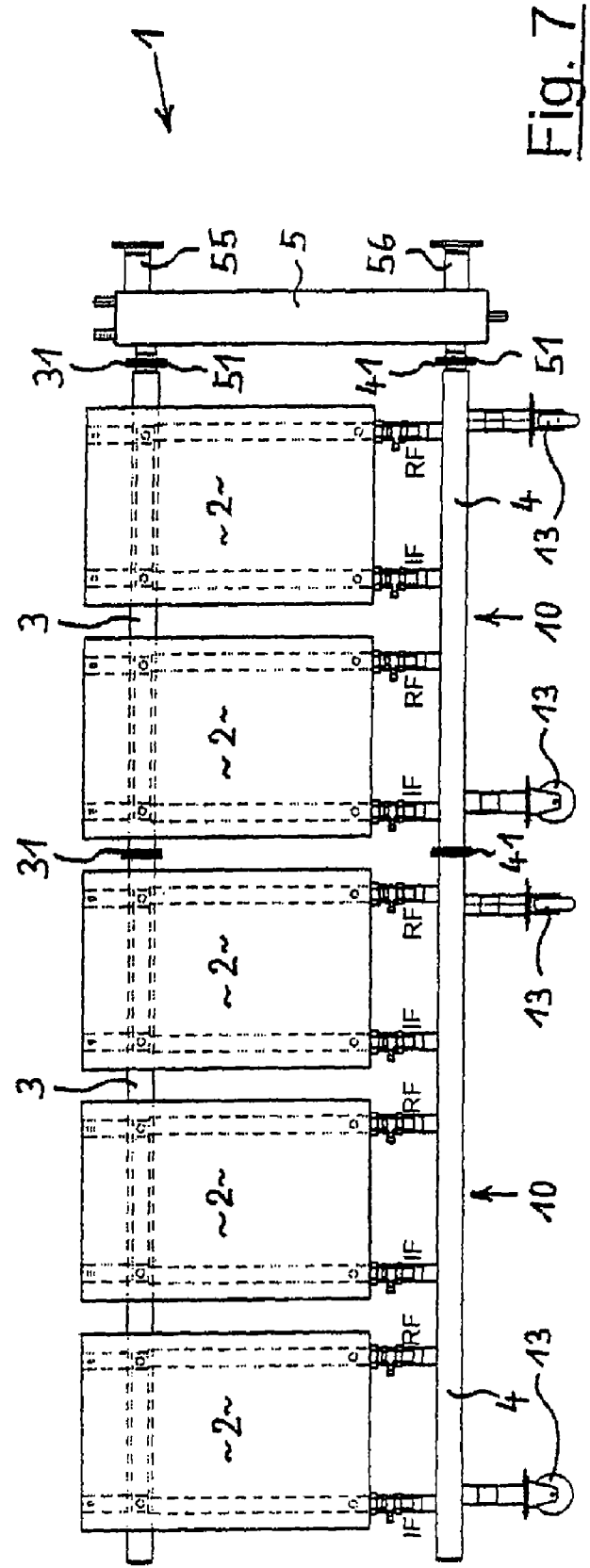
FIG. 7 is the modular cascade unit of FIG. 6 in a front view, in assembled condition.

FIGS. 6 and 7 show a modularly structured cascade unit 1. FIG. 6 shows the two support frames 10 and the associated hydraulic shunt 5 as not yet connected components. This allows a separate transport, with the individual support frames 10 still being easy to transport and to handle when a large heating system is to be installed with more than two or three heating boilers 2. At the place of installation, the two (or even more) support frames 10 and the hydraulic shunt 5 are each mechanically as well as hydraulically coupled with each other, with the completed cascade unit 1 then forming, as seen in FIG. 7.

In the example according to FIGS. 6 and 7 as well, the support frame 10 is formed each by a boiler inlet flow header 3, a boiler return flow manifold 4 and several pairs of vertical pipe sections 63 and 64. In the example shown here, the support frame 10, respectively presented on the left, comprises three pairs of vertical pipe sections 63 and 64 and is thus designed to take up three heating boilers 2. The support frame 10, respectively presented on the right, comprises two pairs of vertical pipe sections 63 and 64 and is thus designed to take up two heating boilers 2.

The header 3 and the manifold 4 of the left support frame each comprise on their right front face one connecting flange 31 and, respectively, 41 each. For the right support frame 10, not only the header 3 but also the manifold 4 are provided, on their two front faces, with matching, identical flanges 31 and 41, respectively. The hydraulic shunt 5 comprises—on its left side facing the right support frame 10 at a suitable distance two connecting flanges 51 which are connectable with the right connecting flanges 31 and 41, respectively of the right support frame 10.

Solely via the connecting flanges 31, 41 and 51, the two support frames 10 and the hydraulic shunt 5 are not only connected with each other mechanically sufficiently solidly, but also hydraulically in a manner impervious to liquids. FIG. 7 reflects the completely connected condition. The integrally designed support frames 10, here again, carry all boilers 2.

Another exemplary embodiment of the cascade unit 1 is presented in FIGS. 8 to 15. In contrast to FIGS. 1 to 7, the embodiment according to FIGS. 8 to 15 comprises boiler inlet flow header 3 and boiler return flow manifold 4 which are horizontally spaced to each other. As before, the boiler inlet flow header 3 and the boiler return flow manifold 4 each extend in a horizontal direction. The boilers 2 are standing on the header 3 and the manifold 4 which will be elaborated on further below.

In the selected presentation, the boiler inlet flow header 3 is in the foreground, with the boiler return flow manifold 4 being hidden by it in the background. Accordingly, only the pipe sections 63 are visible, with the pipe sections 64 hidden by them. The pipe sections 63 and 64, respectively, extend vertically from the header 3 or, respectively, from the manifold 4 to the boiler 2 and are hydraulically and mechanically connected on the one hand with the header 3 and, respectively, the manifold 4 and on the other hand with the boiler 2 via the connecting nozzles 32 and 42, respectively. In contrast to the exemplary embodiments according to FIGS. 1 to 7, the corresponding pipe sections 63 and 64, respectively, comprise no mechanical connection to the respectively not allocated header 3 and manifold 4, respectively.

Figure 8:
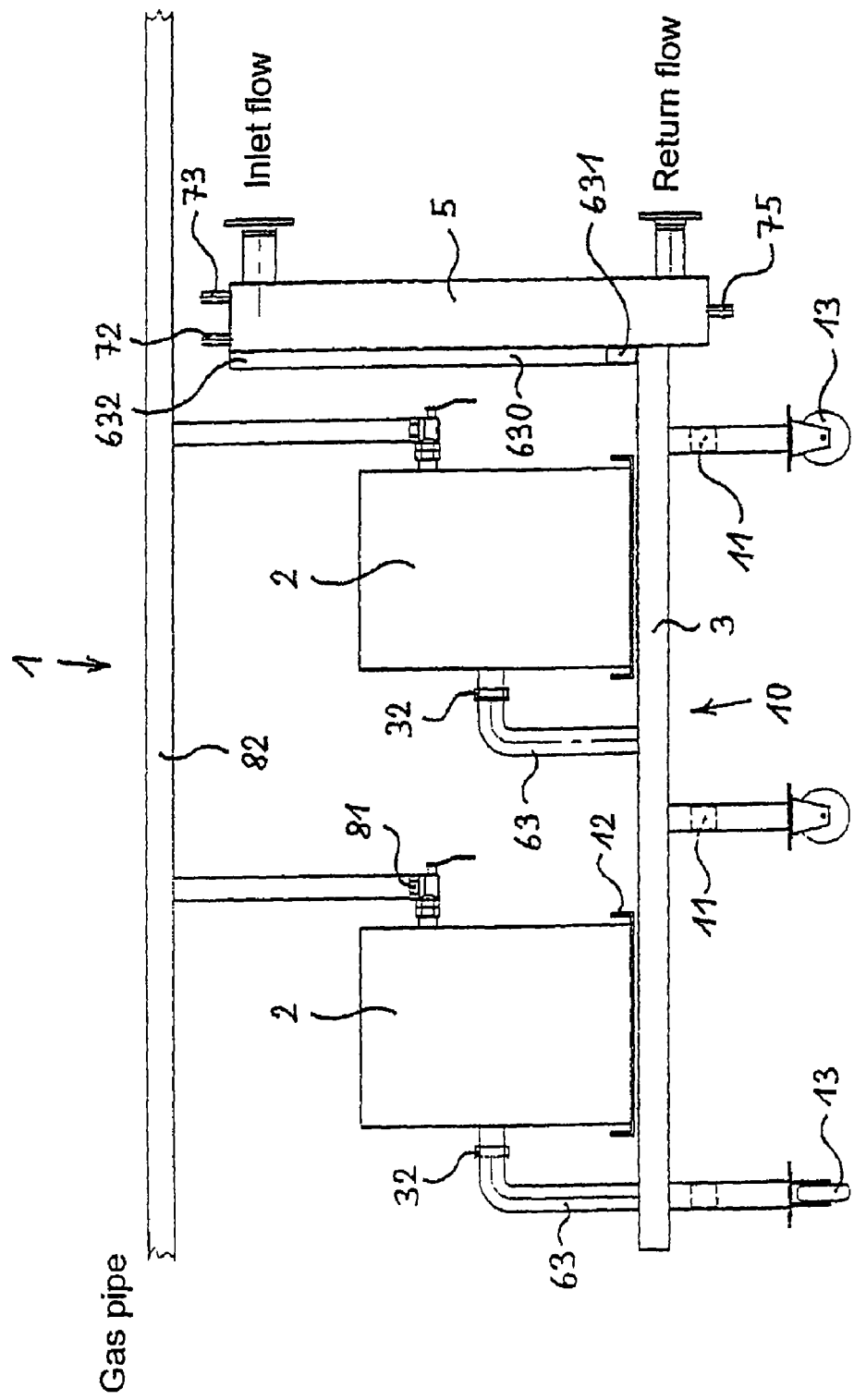
FIG. 8 is the cascade unit in an additional embodiment in a front view.

On their right face end in FIG. 8, the header 3 and the manifold 4 are connected with the vertically aligned hydraulic shunt 5. At the right side of the drawing, the manifold 4 opens directly into the hydraulic shunt 5 for which suitable connecting means can be used. The manifold 4 is hydraulically and mechanically connected with the hydraulic shunt 5.

The header 3 is allocated to a bypass 630 which comprises two line sections 631 and 632. The line section 631 extends in horizontal direction from the header 3 towards the manifold 4 and passes over into a vertical line section 632 which is connected with the hydraulic shunt 5 in its upper end area. The vertical line section 632 extends parallel to the hydraulic shunt 5. The horizontal line section 631 is hydraulically and mechanically connected with the header 3, and a mechanical connection with the manifold 4 can be chosen for supporting the end of the horizontal line section 631 pointing to the manifold 4. Thus, the header 3 is hydraulically connected with the hydraulic shunt 5.

In the exemplary embodiment presented, three crossbars 11 are provided below the header 3 and the manifold 4. The crossbars 11 extend in a horizontal direction and are each provided on the underside with two casters 13 each, of which one each is respectively hidden in FIG. 8.

By means of these casters 13, the complete cascade unit 1 including the boilers 2 can be moved in a rolling mariner by muscle power, without the use of hoisting or transport equipment. After the cascade unit 1 has been brought to its place of installation, the casters 13 can be separated from the support frame 10 and replaced by fixed floor or wall brackets.

In the presented exemplary embodiment, two boilers 2 are allocated to the cascade unit 1 which are held on boiler mounting elements 12. In longitudinal direction of the cascade unit 1, the boilers 2 are spaced from each other and connected to a gas line 82 by means of suitable connections 81. In the presented exemplary embodiment, the gas line 82 extends above the cascade unit 1.

Figure 9:
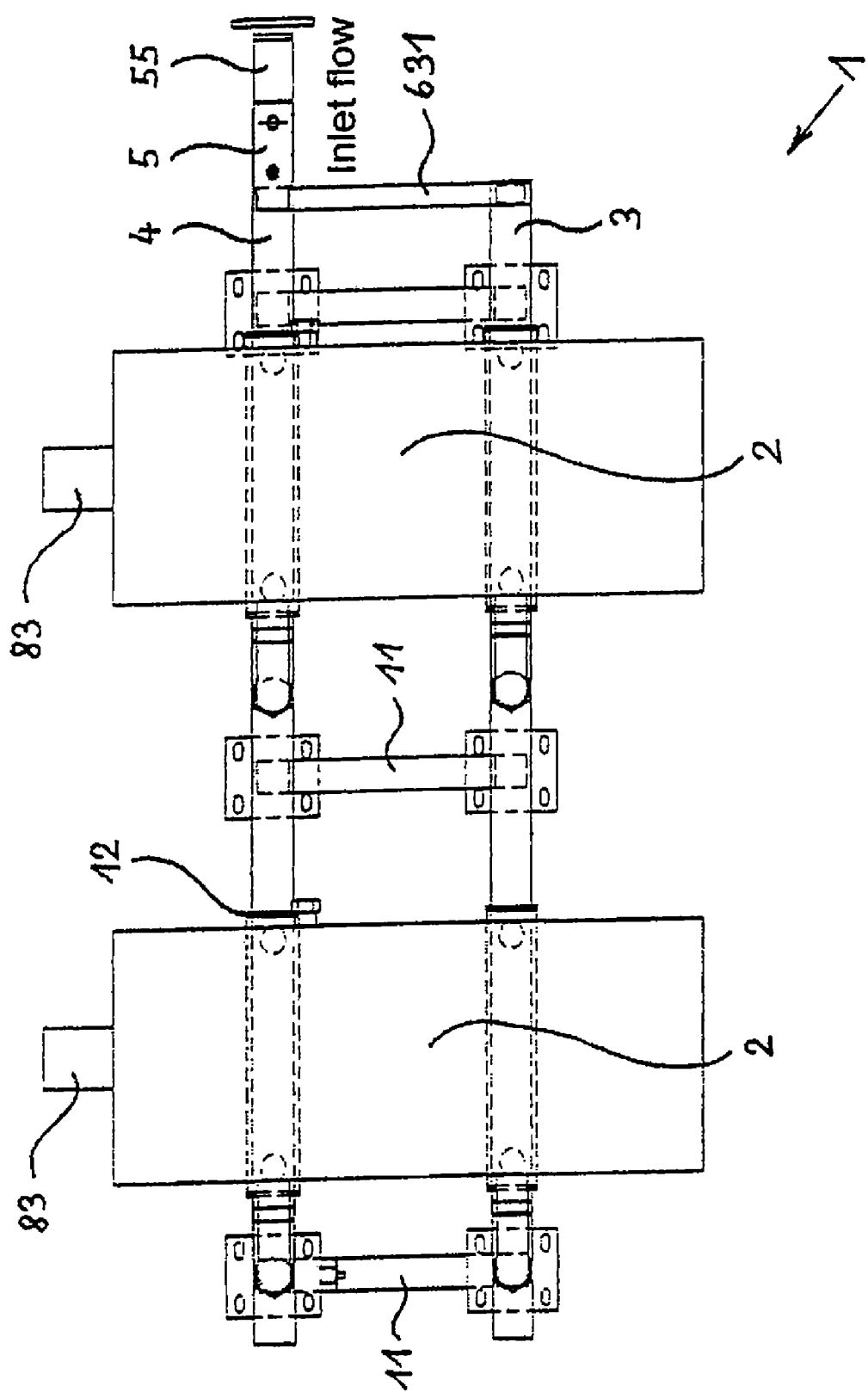
FIG. 9 is the cascade unit of FIG. 8 in a top view.

The boiler mounting elements 12 are designed as U-shaped brackets which rest or, respectively, are connected with their basic leg in a longitudinal direction on the allocated header 3 or manifold 4, respectively (FIG. 9). From the basic segment, U-bars of the mounting element 12 extend from the respectively allocated header 3 or manifold 4, respectively, vertically towards the top. The mounting elements 12 are somewhat wider than the boiler 2 so that the U-bars are spaced to the respectively allocated boiler 2 in the longitudinal direction of the cascade unit 1. In the presented exemplary embodiment, two separate mounting elements 12 each are used for one boiler 2 which are spaced to each other in accordance with the horizontal distance of the header 3 to the manifold 4, minus a lateral projection over the header 3 or the manifold 4, respectively. Of course, a one-piece mounting element 12 could also be used for every boiler 2, such element spanning the free space between the header 3 and the manifold 4 and each somewhat laterally projecting from the header 3 or the manifold 4, respectively.

Additionally, the cascade unit 1 in the example presented in FIG. 8 can also comprise several vent fittings 72 to be able to automatically or manually vent the header 3, the manifold 4 and the hydraulic shunt 5. The sensor 73 is provided on the upper side of the hydraulic shunt 5, for example a thermometer provided in the dip sleeve. Finally, on the lower end of the hydraulic shunt 5, on the part of the cascade unit 1 which is lowest and flowed through by water, the drainage nozzle 75 is provided via which the cascade unit 1 can be drained as needed. Moreover, the nozzle 75 can be used for the removal of sludge which settles in the lower part of the hydraulic shunt 5.

FIG. 9 shows the cascade unit 1 of FIG. 8 in a top view. Clearly evident are the horizontally spaced header 3 and manifold 4, as well as the crossbars 11 arranged thereunder. Moreover, the boilers 2 are mechanically connected with the support frame 10 via the boiler mounting elements 12, with the corresponding mounting elements 12 laterally projecting somewhat from the header 3 or the manifold 4, respectively, which is presented by the broken line. The boilers 2 are arranged advantageously upright, standing on the cascade unit 1. The hydraulic shunt 5 is visible on the top right in FIG. 9 following the right face end of manifold 4 in a top view. The course of the horizontal line section 631 from the header 3 in the direction towards the manifold 4 is also visible. Towards the right, the heating circuit inlet flow connection 55 extends from the hydraulic shunt 5; the heating circuit return flow connection is provided hidden thereunder.

Figure 10:
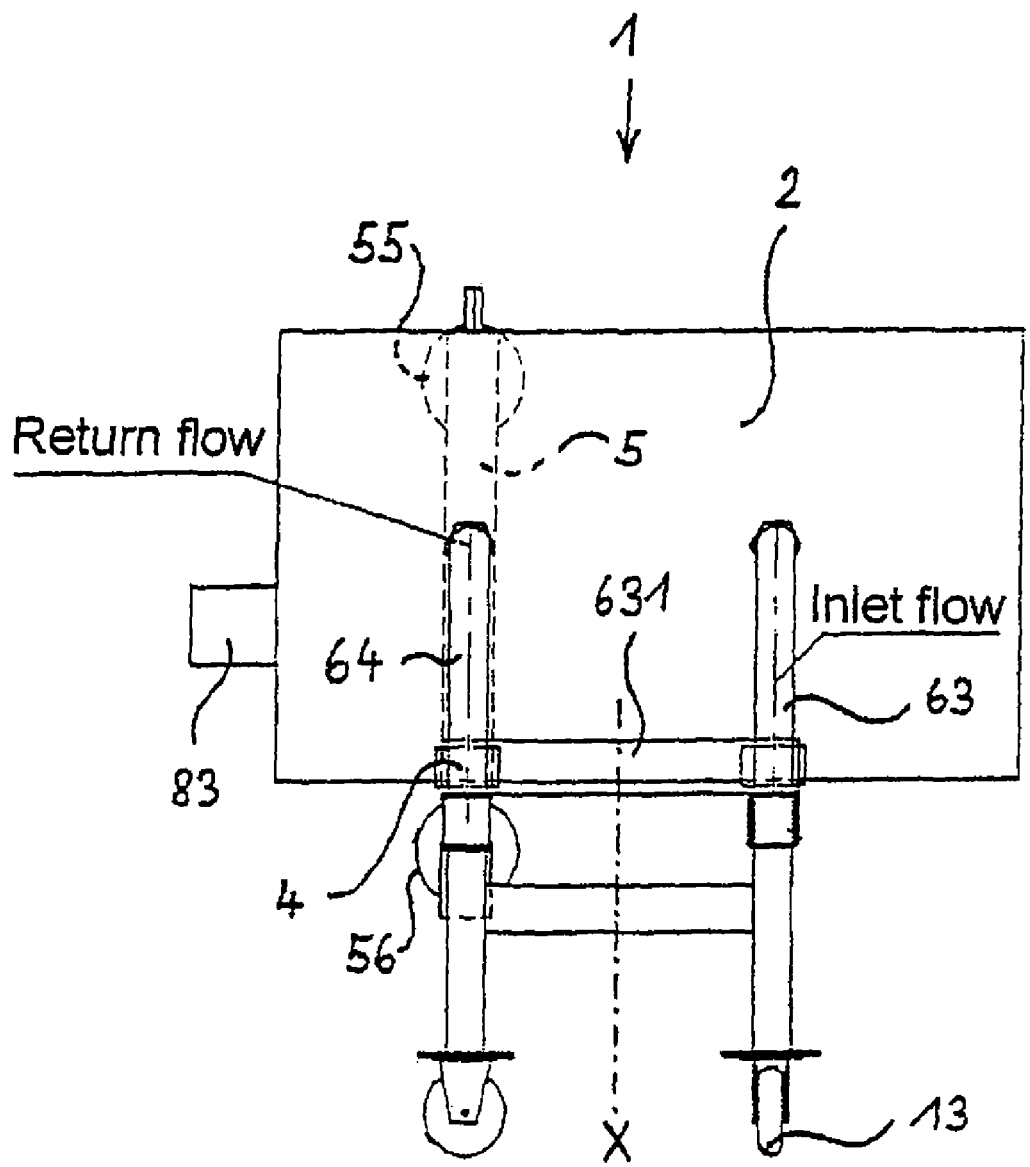
FIG. 10 is the cascade unit of FIGS. 8 and 9 in a side view.

FIG. 10 shows the cascade unit 1 from FIGS. 8 and 9 in a side view, thus onto a side wall of the hindmost boiler 2 seen in the longitudinal direction of the cascade unit 1, relative to the hydraulic shunt 5. A waste gas connection 83 of the boiler 2 is visible in FIGS. 9 and 10. Furthermore, the pipe sections 63 and 64, respectively, are visible in FIG. 10, with the pipe section 63 or, respectively, the inlet flow connection of the boiler 2 being allocated to the header 3, relative to a center axis X on the right side, and the pipe section 64 or, respectively, the return flow connection of the boiler 2 being allocated to the manifold 4 on the left side opposite thereto. Moreover, one of the crossbars 11 is visible, hiding the other crossbars. From the header 3, the horizontal line section 631 is extended towards the manifold 4. The vertical line section 632 is not presented in FIG. 10. The hydraulic shunt 5 is presented in a broken line since it is provided, in the selected view, hidden in the background by the boiler or boilers 2. Underneath the horizontal line section 631 or, respectively, the manifold 4, the heating circuit return flow connection 56 is visible, with the heating circuit inlet flow connection 55 being covered and therefore presented in a broken line.

Figure 11:
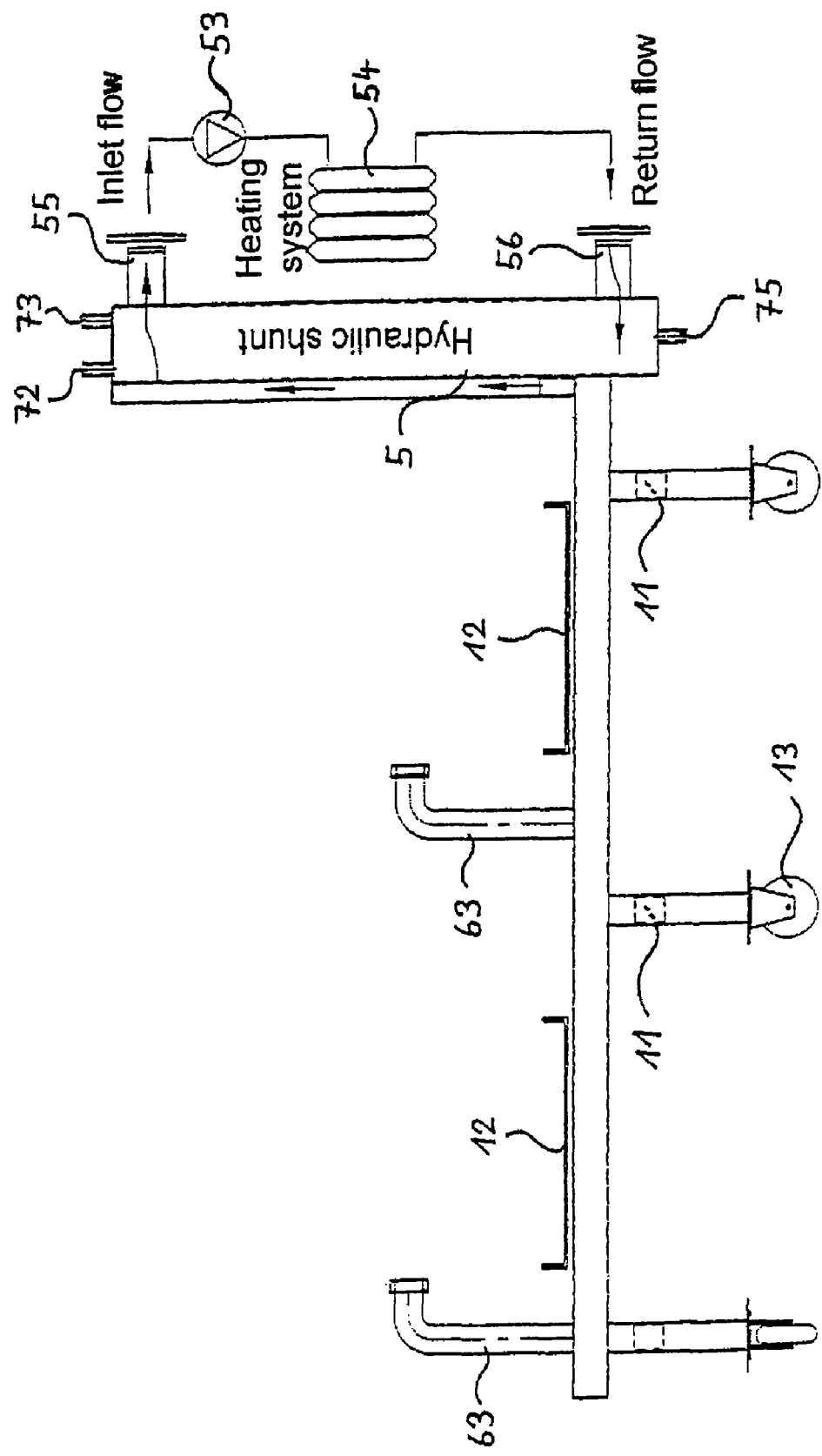
FIG. 11 is the cascade unit of FIG. 8 in a front view without a boiler.

In FIG. 11, the cascade unit 1 is presented without the installed boilers 2, with the gas line 82 also being cut away. However, the vent fitting 72, the sensor 73 and the bottom arranged drainage nozzle 75 of the hydraulic shunt 5 can be taken exemplarily from FIG. 11. Furthermore, the connection of the heating circuit with the optional pump 53 is principally shown and the exemplary heating system 54 to the connections 55 and 56.

Figure 12:
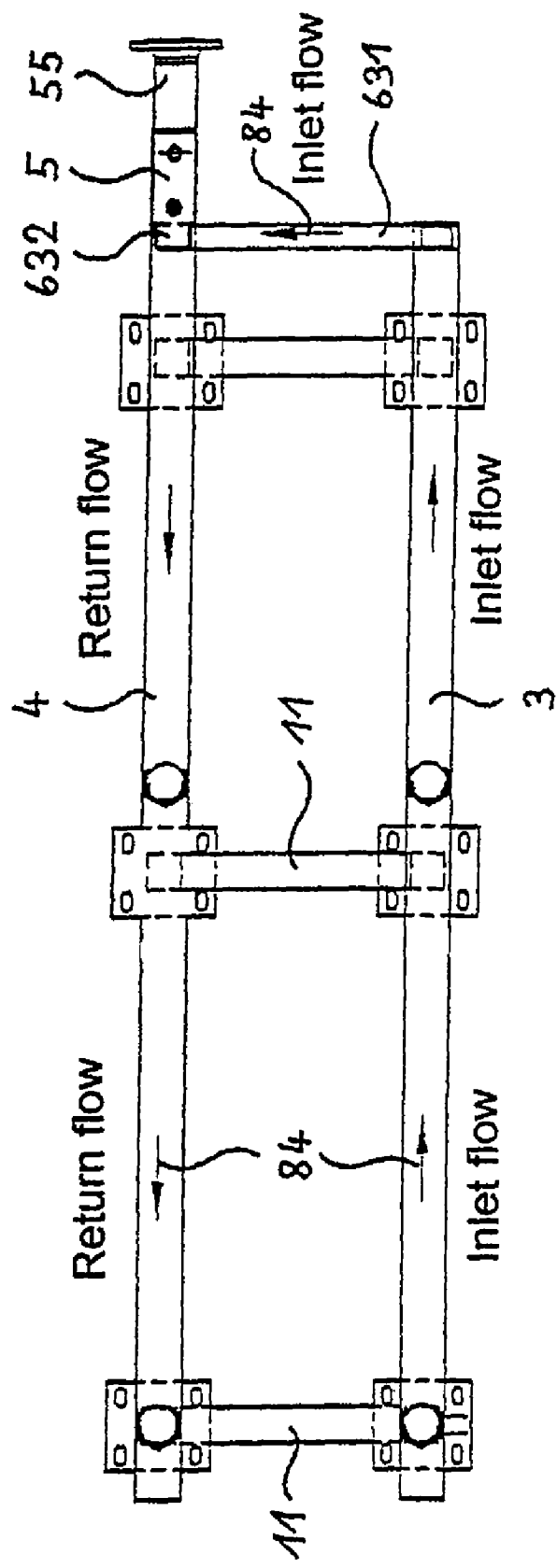
FIG. 12 is the cascade unit of FIG. 11 in a top view.

In FIG. 12, which is principally equivalent to FIG. 9, only without boiler 2, the flow of the heating water is exemplarily presented by means of the arrows 84 in the header 3, the manifold 4 and the bypass 630, in particular in its horizontal line section 631.

Figure 13:
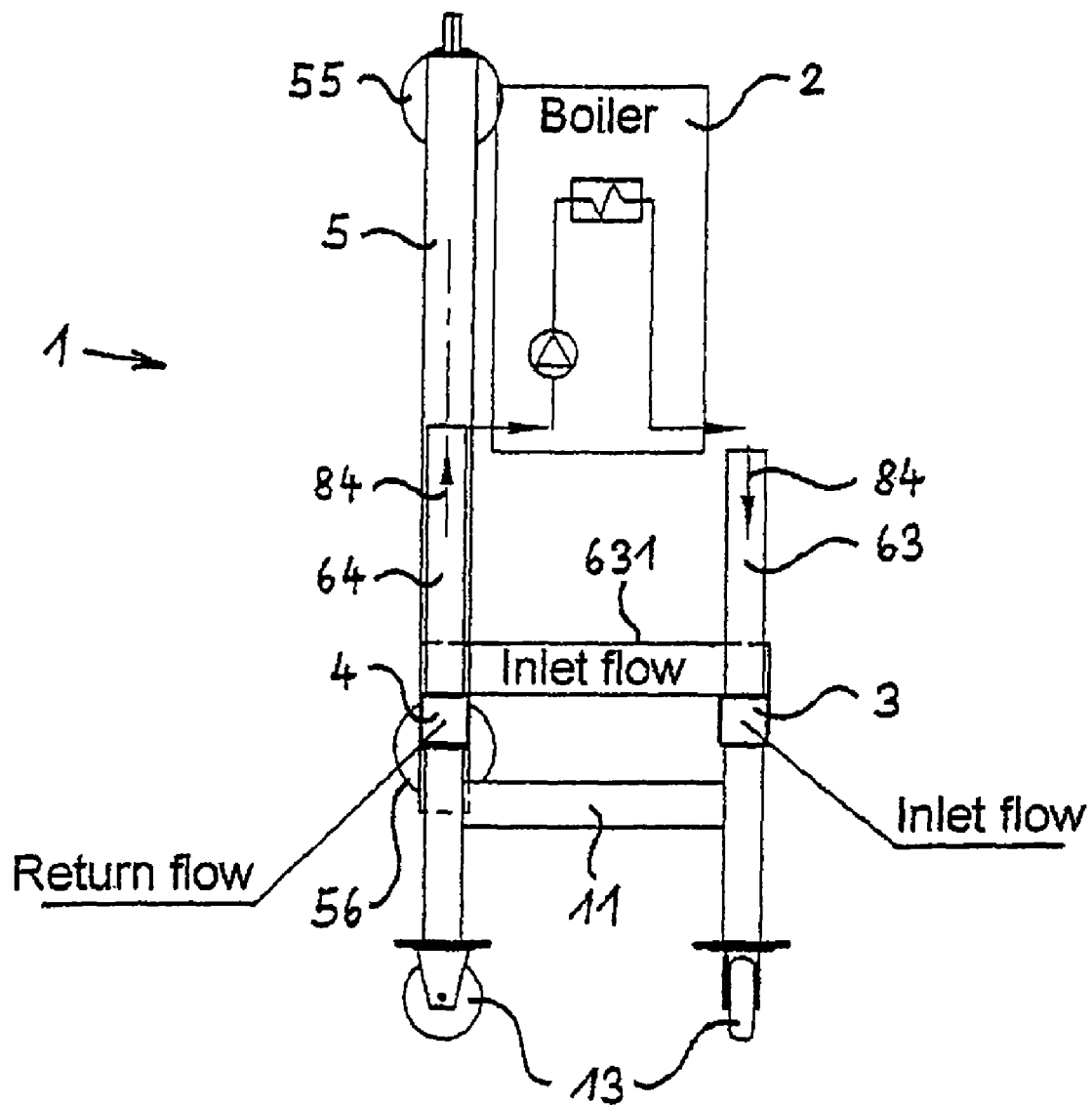
FIG. 13 is the cascade unit of FIGS. 11 and 12 in a side view.

FIG. 13 presents the cascade unit 1 in a side view, with the flow of the water being shown by means of the arrows 84 in the piping sections 63 and 64, respectively, and through the boiler. Relative to the piping section 64, the hydraulic shunt 5 is provided behind it, with the piping section 64 being somewhat narrower than the hydraulic shunt 5. The piping section 63 arranged on the right laterally thereto preferably has the same dimension as the piping section 64. The flow of the water from the manifold 4 via the piping section 64 through the boiler 2 via the piping section 63 into the header 3 is, in turn, exemplarily presented by means of the arrows 84.

Figure 14:
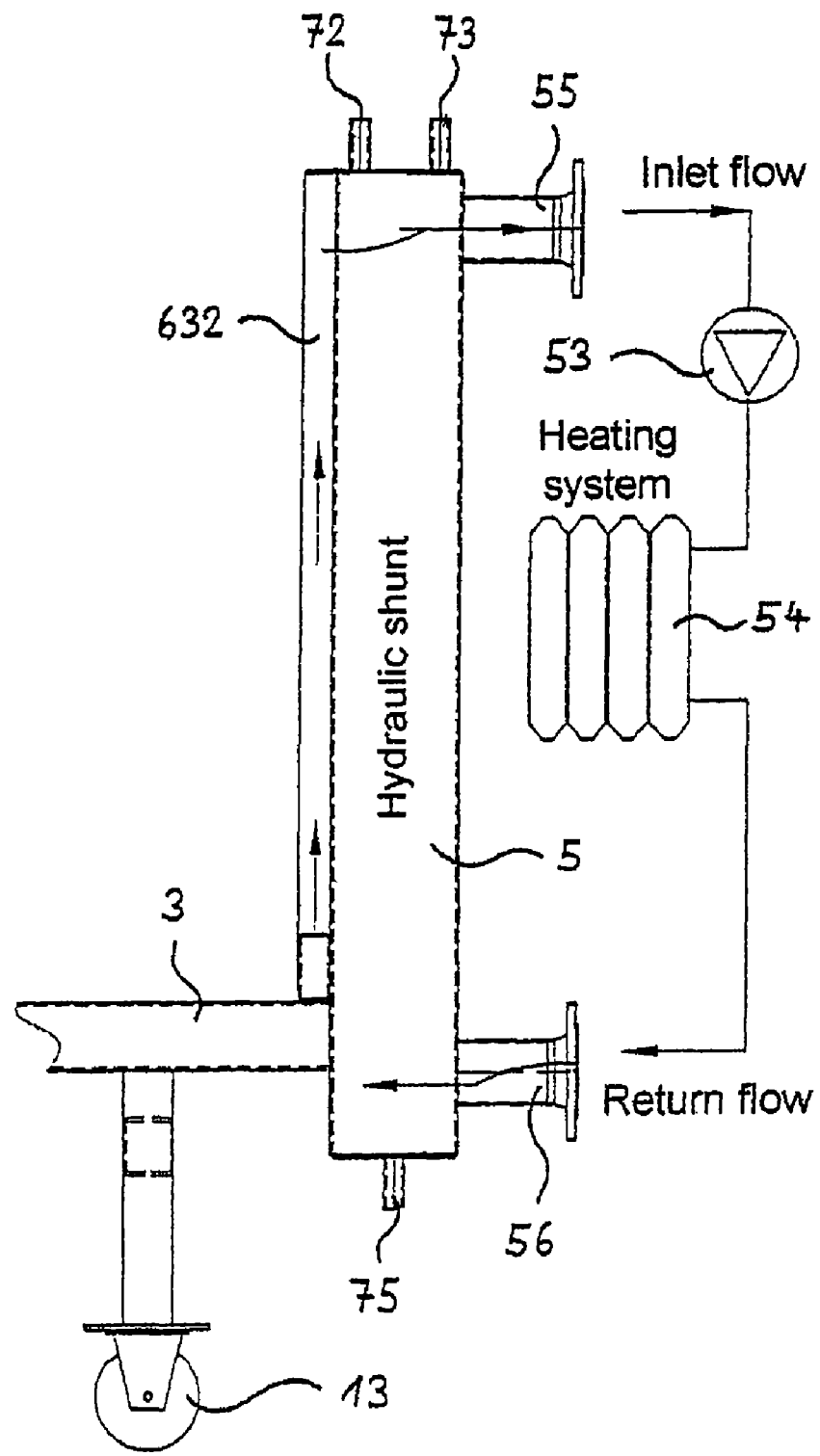
FIG. 14 is the cascade unit of FIG. 8 as a section with the hydraulic shunt as a detail in a front view.
Figure 15:
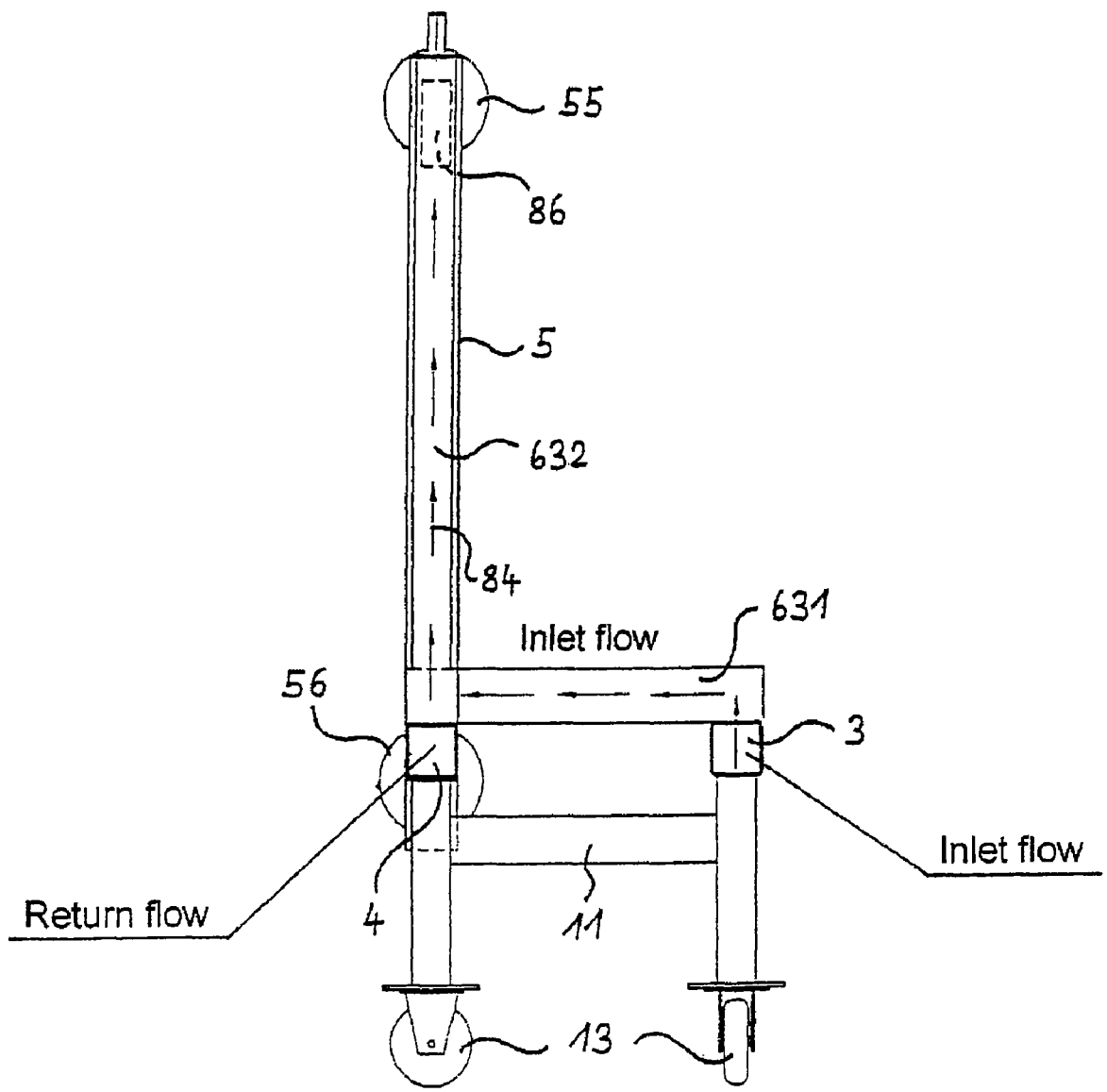
FIG. 15 is the cascade unit of FIG. 8 in a side view.

In FIG. 14, one part of the cascade unit 1 with the hydraulic shunt 5 is shown enlarged in a front view, with FIG. 15 showing a side view to FIG. 14.

The manifold 4 opens directly into the hydraulic shunt 5, with the horizontal pipe section 631 being provided above the manifold 4 and being presented supporting itself on the manifold 4. The horizontal line section 631 can here be connected with the manifold 4, for example in a positive material connection, preferably welded. The vertical line section 632 extents vertically to the horizontal line section 631 in the direction of the upper end area of the hydraulic shunt 5 and opens into it. The vertical line section 632 can be connected or, respectively, mounted to the hydraulic shunt in a suitable manner to secure the position.

FIG. 15 presents exemplarily, by means of the arrows 84, the flow of the water from the header 3 through the bypass 630 with its two line sections 631 and 632 into the hydraulic shunt 5, with a flow connection from the vertical line section 632 into the hydraulic shunt 5 being exemplarily shown by means of the recess 86, presented in a broken line. The vertical line section 632 is somewhat narrower than the hydraulic shunt 5.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A cascade unit for a heating system, comprising:
   at least two heating boilers, and a hydraulic shunt which is connected on the one hand with the inlet flows and return flows of all heating boilers and on the other hand with at least one heating circuit inlet flow and heating circuit return flow, the cascade unit comprising one each of an essentially horizontally extending boiler inlet flow header and boiler return flow manifold, the header and the manifold being connected with the hydraulic shunt, and the header and the manifold each having prepared connecting nozzles, placed for a group of two or more heating boilers for the connection of the heating boiler inlet flows and the heating boiler return flows, wherein the cascade unit itself forms a self-supporting support frame on which the at least two heating boilers are mounted;

wherein the header and the manifold are bearing elements of the self-supporting support frame and carry at least a portion of the weight of the at least two heating boilers, the self-supporting support frame enabling the at least two heating boilers to be structurally supported without separately supporting the at least two heating boilers from a floor, a wall, or a ceiling of a room in which the at least two heating boilers are disposed;

wherein the header and the manifold are spaced apart from one another in a common plane;

and wherein branch piping sections acting as bearing elements are arranged between, and structurally connected to, the header and the manifold, the branch piping sections also being fluidly connected to either the header or the manifold and carrying water at least over partial sections of their length.

2. A cascade unit according to claim 1, wherein the header and the manifold are spaced apart from one another in a common vertical plane and the branch piping sections extend vertically from the header to the manifold, with the branch piping sections comprising connecting nozzles for the connection of the heating boiler inlet flows and the heating boiler return flows.

3. A cascade unit according to claim 2, wherein the header, the manifold and the branch piping sections are hydraulically and statically adequately dimensioned square steel pipes having one of a round and square cross section.

4. A cascade unit according to claim 1, wherein the header and the manifold are each connected on their one lateral face end with the hydraulic shunt, the hydraulic shunt being arranged in an essentially vertical orientation, with the header connecting to the hydraulic shunt on the top and the manifold on the bottom.

5. A cascade unit according to claim 4, wherein the hydraulic shunt is firmly connected with the header and the manifold and forms a bearing element of the self-supporting support frame.

6. A cascade unit according to claim 4, wherein the hydraulic shunt is detachably connected with the header and the manifold forms a non-bearing element or a bearing element of the self-supporting support frame.

7. A cascade unit according to claim 1, wherein the cascade unit comprises several self-supporting support frames which are each mechanically and hydraulically detachably connected in an area of face ends of the header and the manifold.

8. A cascade unit according to claim 7, wherein the header and the manifold are each formed on one or on both face ends with one connecting flange each.

9. A cascade unit according to claim 1, wherein the self-supporting support frame comprises prepared boiler mounting elements adjusted to the boiler to be mounted.

10. A cascade unit according to claim 1, wherein the self-supporting support frame comprises at least one of mounting elements and connections for other components of the cascade unit, including one or more of expansion vessels, vent fittings, sensors, control devices.

11. A cascade unit according to claim 1, wherein a line section with line branches to all mounted boilers is arranged on the support frame for the supply of fuel.

12. A cascade unit according to claim 1, wherein on the support frame, one line section is arranged with line branches from all mounted boilers for the collection and removal of one of waste gases and condensate.

13. A cascade unit according to claim 1, wherein several casters are provided on an underside of the self-supporting support frame.

14. A cascade unit according to claim 13, wherein the casters are detachably mounted on the support frame and are capable of being replaced by one of floor and wall brackets.

* * * * *